United States Patent
Bücker et al.

(10) Patent No.: US 8,262,333 B2
(45) Date of Patent: Sep. 11, 2012

(54) CONNECTING ELEMENT AND CONNECTING ARRANGEMENT

(75) Inventors: Rolf Bücker, Bamberg (DE); Martin Schlechtriemen, Staffelbach (DE); Sebastian Schnetter, Memmelsdorf (DE); Horst Weber, Wirsberg (DE); Peter Herzog, Strullendorf (DE); Mathias Heppner, Burgkunstadt (DE); Thomas Hülsebusch, Waizendorf (DE)

(73) Assignee: Brose Fahrzeugteile GmbH & Co., Coburg (DE)

( * ) Notice: Subject to any disclaimer, the term of this patent is extended or adjusted under 35 U.S.C. 154(b) by 4 days.

(21) Appl. No.: 12/097,207

(22) PCT Filed: Nov. 27, 2007

(86) PCT No.: PCT/EP2007/010274
§ 371 (c)(1),
(2), (4) Date: Oct. 6, 2008

(87) PCT Pub. No.: WO2008/101531
PCT Pub. Date: Aug. 28, 2008

(65) Prior Publication Data
US 2010/0272540 A1    Oct. 28, 2010

(51) Int. Cl.
*F16B 21/02*    (2006.01)
(52) U.S. Cl. ........................ 411/349; 411/999
(58) Field of Classification Search .................. 411/349, 411/549–553, 999
See application file for complete search history.

(56) References Cited

U.S. PATENT DOCUMENTS

| | | | | |
|---|---|---|---|---|
| 3,480,311 A | * | 11/1969 | Lanham, Jr. | 403/408.1 |
| 3,744,101 A | * | 7/1973 | Gley | 24/453 |
| 3,956,803 A | | 5/1976 | Leitner | |
| 4,227,287 A | * | 10/1980 | Gunther | 411/552 |
| 4,293,263 A | * | 10/1981 | Zankl | 411/500 |
| 4,762,437 A | | 8/1988 | Mitomi | |
| 4,801,232 A | * | 1/1989 | Hempel | 411/552 |

(Continued)

FOREIGN PATENT DOCUMENTS

CN    2 646 461    10/2004

(Continued)

OTHER PUBLICATIONS

German Translation of a First Office Action issued in a corresponding Chinese Application No. 200780001584, accompanied by an English Machine-generated translation thereof.

*Primary Examiner* — Flemming Saether
(74) *Attorney, Agent, or Firm* — Scott T. Weingaertner; John O. Gilmore; King & Spalding LLP

(57) ABSTRACT

The invention relates to a connecting element for the mechanical connection of at least two components, in particular two components of a motor vehicle door, with a bearing collar for bearing against a first component, with a crossbar that has bearing flanks for bearing against a second component and for clamping the latter against the first component in a rotated final assembly position, and with a shaft section, which bears the crossbar, for rotatably passing through corresponding openings in the components. In this case, a means is provided for fastening to the first component in a defined preassembly position. Furthermore, the invention relates to a corresponding connecting arrangement comprising at least two components each having an aperture, and a connecting element of this type, with the connecting element being held on the first component in a preassembly position.

30 Claims, 8 Drawing Sheets

U.S. PATENT DOCUMENTS

| | | | | |
|---|---|---|---|---|
| 5,123,795 | A * | 6/1992 | Engel et al. | 411/552 |
| 5,361,925 | A * | 11/1994 | Wecke et al. | 220/325 |
| 5,368,427 | A * | 11/1994 | Pfaffinger | 411/553 |
| 5,906,463 | A * | 5/1999 | Damm et al. | 411/369 |
| 6,722,831 | B2 * | 4/2004 | Rogers et al. | 411/345 |
| 6,988,863 | B2 | 1/2006 | Hulin et al. | |
| 7,581,913 | B2 * | 9/2009 | Ordonio et al. | 411/542 |

FOREIGN PATENT DOCUMENTS

| | | |
|---|---|---|
| DE | 93 11 243 | 10/1993 |
| DE | 198 38 560 | 3/2000 |
| EP | 0 943 824 | 2/1999 |
| EP | 0 943 824 | 9/1999 |

\* cited by examiner

CONNECTING ELEMENT AND CONNECTING ARRANGEMENT

FIELD OF THE INVENTION

The present invention relates to a connecting element for the mechanical connection of at least two components, in particular two components of a motor vehicle door, with a bearing collar for bearing against a first component, with a crossbar having bearing flanks, wherein the bearing flanks are designed for bearing against a second component and for prestressing the latter against the first component in a rotated final assembly position, and with a shaft section for rotatably passing through corresponding openings in the components. The invention furthermore relates to a connecting arrangement comprising at least two components each having an aperture, and an abovementioned connecting element, wherein the connecting element reaches through the axially aligned apertures of the components in a final assembly position, and is rotated in relation to a first insertion angular position into a final angular position in order to produce the connection.

BACKGROUND OF THE INVENTION

A connecting element of this type is used in particular for the mechanical connection of an inside door panel of a motor vehicle to a unit carrier, for the connection of the unit carrier to a decorative support shell or for the connection of all three components. In this case, at least two plate-like components are connected to each other by means of a rapid-action fastening such that, for example, the subassemblies of motor vehicle doors can be fitted rapidly and without tools being used.

DE 198 38 560 A1 discloses a rotary rapid-action fastening in the form of a rotatable retaining element with a head section and a shaft section for the interconnection of a plurality of components, in particular for the connection of an inside door panel of a motor vehicle, a unit carrier and a decorative support shell.

EP 0 943 824 A1 furthermore discloses a mechanical connecting element with a head, with a bolt provided on one side of the head and with a web-shaped locking bar.

For the assembly, the components which are to be connected are first of all placed on one another in situ with their apertures in alignment. Subsequently, the known connecting elements are inserted into the aligned apertures of the components and rotated into the final assembly position with a clamping force being formed. The disadvantage of this process is that it is time-consuming, since the components that are to be connected frequently have to be placed onto one another in restricted space conditions and without direct sight of the connecting point. In addition, the connecting elements can easily be lost.

It is furthermore known from G 93 11 243 U1 and from U.S. Pat. No. 4,762,437 to configure a connecting element for a preassembly position on the first component, the connecting element in this case being supported with its crossbar on the first component. This reduces the outlay on assembly. In addition, the connecting element which is fastened to the first component can be repeatedly used after the second component is detached.

SUMMARY OF THE INVENTION

A primary aim of the invention is to provide a connecting element which can be fitted as easily as possible. In particular, the connecting arrangement is intended to be produced rapidly and as simply as possible. A further aim of the invention is to provide precautions which can prevent the connecting element from being lost.

A connecting arrangement according to the invention for the mechanical connection of at least two components, constructional units and/or modules in a defined assembly position and/or installed position by means of a connecting element that reaches through axially aligned apertures of the at least two components in a final assembly position and that is rotated in relation to a first insertion angular position into a final angular position is characterized in that the connecting element is held on the first component in a preassembly position in which the crossbar is located in the aperture of the first component.

The invention is based on the consideration that the known connecting arrangements which are provided with preassembly of the connecting element sometimes considerably interfere with and/or impair the assembly sequence and any assembly freedom which may be required, since the crossbar that is supported on the first component and the shaft end of the locking element protrude considerably out of the aperture of the first component in the preassembly position.

The arrangement according to the invention is now distinguished in that the crossbar of the connecting element is located in the aperture of the first component in the preassembly position. To this extent, the assembly sequence of the two components is not impaired by means of protruding corners and edges of the connecting elements pre-fitted thereto. The assembly freedom is considerably increased in comparison to the prior art.

The arrangement provided is suitable in particular for the connection of door components of a motor vehicle, in particular for the common fixing of a unit carrier and/or a decorative support shell to an inside door panel of a vehicle door. After its preliminary placing in one of the components that has a corresponding aperture for a shaft section and/or a bearing collar for the exact positioning, the connecting element is held in the component without its shaft end protruding substantially beyond the aperture. It is thereby possible to ensure that the parts can be reliably fitted even in unfavorable installation positions. After the parts that are to be connected are joined together, the connecting element is located in its position and can be brought into a locked final position in a simple manner. The locking of the connecting element can optionally take place without a tool, i.e. manually, or with the aid of a suitable tool.

The connecting element is advantageously held in the preassembly position in such a manner that it does not protrude over the rear side of the first component, which side faces the second component, in particular in such a manner that it is aligned with the rear side of the first component. This permits even easier fitting of the first component to the second component, in particular in the case of constricted installation spaces, since guidance of the first component in relation to the second component is in no way obstructed by the connecting element.

In a preferred development, the connecting element is latched to the first component. This makes it possible for the connecting element to be positioned captively on the first component such that the connecting element is reliably available at the assembly site for the final assembly.

A furthermore advantageous configuration of the connecting arrangement provides that, in the preassembly position, the connecting element at least partially reaches through the aperture of the first component and is latched in the aperture of the first component. This latching is preferably designed in such a manner that the connecting element is firstly prevented from dropping out and secondly is not pushed too far in the direction of the final assembly position by the first component so as not to impair the installation or the precisely fitting joining together of the components that are to be connected. However, if appropriate, the connecting element may protrude through the aperture of the first component in the latched preassembly position to the extent such that it can serve as a positioning aid, for example by sections of the connecting element that are locked to the second component in the final assembly position firstly only forming a more or less loose guide in order to precisely meet the second aperture of the second component, which aperture is aligned with the first aperture of the first component.

Furthermore, it is expedient if the connecting element is latched in the second aperture of the second component in the final assembly position. This latching may take place, if appropriate, without a tool. It is important that the connecting element cannot be detached by itself, and is securely locked and remains latched under all operating conditions even if the assembly lasts for a relatively long amount of time.

According to a further advantageous configuration of the connecting arrangement, the connecting element can bear with its stop collar against an axial stop of the first component in the final assembly position. This ensures a frictional and form-fitting connection. The second component is clamped to the first component via the stop surfaces bearing against each other.

In addition, the first component can have a centering device for axially and radially securing the connecting element and/or for visually displaying the insertion angular position and the final angular position. For this purpose, for example, guide elements in the form of guide webs or the like can be provided, the guide elements ensuring exact positioning of the locked connecting element and/or ensuring that the connecting element can be brought in an exactly predetermined direction into the final assembly position. The guide webs can additionally serve as a visual check for the two final angular positions of the connecting element, which is rotatable between an unlocked and locked position, for example by provision of corresponding markings that can be brought to coincide with each other by rotation of the element.

Furthermore, an additional seal can be provided in the region of the axial bearing collar, the seal being able to ensure a certain elastic prestress and sealing of the components if this is desired. An axial prestress by means of such a seal is provided in particular also to compensate for tolerances and to ensure a firm fit of the connecting element. The seal can be assigned in this case either to the connecting element or to the first component.

In an advantageous embodiment, the centering device is formed by the aperture of the first component, the aperture corresponding to the crossbar of the connecting element in the preassembly position. As an addition or alternative, the centering device can be formed by an in particular annular enclosure of the bearing collar that is attached to the first component. This brings about reliable centering and therefore a secure connection in the final assembly position. Lateral yielding of the connecting element is thereby prevented.

A reliable connection of the at least two components by means of the connecting element can be ensured in that the connecting element clamps the first component and the second component against each other with a defined clamping force in the final assembly position. For this purpose, it can be provided in particular that the connecting element engages behind the second component by means of bearing flanks in the final assembly position. The at least two components are therefore connected to each other by the bearing collar and the bearing flanks. Latching devices are expediently provided, the latching devices ensuring, in interaction with the bearing flanks or independently thereof, a slight latching of the connecting element in its final angular position such that, in addition to the prestressing force of the bearing flank, which is beveled or provided with a suitable ramp, additional protection against inadvertent detachment, for example in the case of relatively strong shaking or vibrations, is provided.

The object is furthermore achieved by a connecting element for the mechanical connection of at least two components, in particular two components of a motor vehicle door, with a bearing collar for bearing against a first component, with a crossbar having bearing flanks, wherein the bearing flanks are designed for bearing against a second component and for prestressing the latter against the first component in a rotated final assembly position, and with a shaft section, which bears the crossbar, for rotatably passing through corresponding openings in the components, with a means for fastening to the first component being formed in a defined preassembly position.

In other words, the connecting element for the mechanical connection of the at least two components has essentially three functional sections that can be connected in particular integrally to one another. The first functional section is formed here by a bearing collar that bears against the first component in the final assembly position. The second functional section is formed by a shaft section, the diameter of which corresponds to the openings of the two apertures of the components and which is rotatable therein. The third functional section comprises the bearing flanks that bear against the second component in the final assembly position and clamp the component against the first component. An additional fourth functional section of the connecting element is provided by a means for fastening the connecting element to the first component in a defined position in the preassembly position.

The means for fastening to the first component in a defined preassembly position can be provided, for example, by means of a releasable frictional connection or form-fitting connection such that the connecting element can easily be placed into the preassembly position of the first component and can also be easily transferred again during the assembly into the final assembly position.

The fastening means is advantageously provided by a latching device. The latching device can be formed, for example, by at least one latching tongue that is arranged in the region of the shaft section and that engages in a corresponding receptacle in the region of the first aperture of the first component in the preassembly position. A latching tongue of this type can protrude, for example, out of the rear side of the bearing collar of the connecting element and can be arranged in the vicinity of the shaft section and parallel to the direction of its longitudinal extent such that it is pressed elastically against the shaft section, when the shaft section is pushed into the opening provided for it in the first component, and can latch into a matching receptacle, groove or opening in the region of the circumferential surface of the aperture or at another suitable location as soon as the preassembly position is reached.

The preassembly position is expediently characterized in that the connecting element is not fully pushed into the aperture of the first component, and therefore the shaft section only partially enters it. Two or more such latching tongues that are expediently arranged symmetrically around the shaft section of the connecting element can optionally be provided.

Furthermore, it can be advantageous if the latching device comprises an additional locking device which, in interaction with an offset in the region of the first aperture of the first component, forms a means of securing against dropping out and a means of securing against rotation. The locking device can be formed in particular by at least one snap-in tongue that is arranged in the region of the shaft section and/or in the region of the bearing flank of the connecting element. When the shaft section is pushed through the aperture, such a snap-in tongue can slide along the edge of the aperture and can easily be compressed such that, after a defined insertion length, it engages behind the first component and forms a type of barb that prevents the connecting element from being able to unintentionally drop out of the aperture of the first component when the latter is in its installed position and is brought into contact with the second component. In particular, two or four of the snap-in tongues that are expediently placed in a symmetrical arrangement on the shaft section can be provided. It can thereby be prevented that the shaft section can be brought out of engagement with the first component by means of slight tilting. In order to form the barb function described, it is appropriate in particular to form the snap-in tongues with their free end against the supporting surface. This configuration at the same time brings about a means of securing against rotation, since the crossbar is held in the aperture, which makes rotation impossible. Simple assembly is therefore made possible, since the connecting element secured in this manner can be guided, without a rotational movement, through the further aperture of the second component, which aperture is axially aligned with the first aperture.

The snap-in tongues can furthermore advantageously be configured in such a manner that they can serve as an additional position and centering aid when the first component is placed on the second component.

It is furthermore advantageous if a stop to limit the rotation of the connecting element during the assembly is provided. In particular, the stop is designed in such a manner that, in interaction with the first component, it permits the rotation to at maximum 90° in relation to the preassembly position. The position that is rotated through 90° in relation to the preassembly position then corresponds to the final assembly position.

In a further advantageous configuration, in the preassembly position, the connecting element at least partially penetrates the aperture of the first component, and, in a preassembly angular position rotated against the insertion angular position, is supported in a manner such that it is latched against the contour of the aperture of the first component. This configuration ensures that the connecting element cannot be pressed through in the preassembly position in the direction of the final assembly position. This is prevented by the connecting element being located in a preassembly angular position that is rotated against the insertion angular position, with it being supported here against the contour of the aperture. By means of a latching of the rotated preassembly position, inadvertent rotation in the insertion angular position is prevented. Only when the connecting element is rotated out of the preassembly angular position to the insertion angular position is a further axial movement through the aperture possible.

Expediently, the contour of the aperture here on the first component is designed in such a manner that the connecting element is moved out of the supported, latched position during rotation from the preassembly angular position into the insertion angular position, and the crossbar can be guided axially through the aperture. In other words, in the preassembly position with a preassembly angular position of the connecting element, the crossbar of the connecting element can be introduced only as far as a stop in the contour of the aperture, with latching taking place at the same time. In this position, further pressing through the connecting element is not possible. When the connecting element is rotated from the preassembly angular position into the insertion angular position, the latching is released and the crossbar passes in the process into an angular position such that it can be passed axially through the correspondingly configured aperture. The connecting element with its crossbar can therefore only be passed through the aperture by means of a combination of a linear and a rotational movement. In this case, the contour of the aperture can in particular be designed in such a manner that the crossbar can be introduced linearly only with an orientation of the connecting element in the preassembly angular position until the connecting element strikes and latches. In the latched position, the connecting element can then be rotated into the insertion angular position in which the crossbar can then be guided linearly further through the aperture.

To configure this predetermined sequence of movement, it is expedient to form the latching device with the locking device on the connecting element by means of at least one snap-in tongue and by means of at least one radial latching pin that is arranged on the shaft section in a manner offset axially with respect to the snap-in tongue and is designed for stopping against a circumferential projection in sections of the contour of the aperture of the first component. During the initial linear movement of the connecting element into the aperture of the first component, the latching pin protruding radially from the shaft section strikes against the circumferential projection provided in sections of the contour of the aperture. The latching tongue can then be designed to latch in relation to the contour and in particular in relation to the circumferential projection in sections thereof. If the connecting element is rotated from the preassembly angular position into the insertion angular position, then the latching pin runs along the circumferential projection in sections in the circumferential direction until the circumferential projection ends. At the end of the circumferential projection, further guidance of the connecting element axially is then possible, since the latching pin has no more means of stopping it.

The latching with the circumferential projection of the contour of the aperture, which prevents the connecting element from rotating further and also from dropping out of the aperture, is expediently brought about by the snap-in tongue being designed to engage behind the circumferential projection on the first component. For this purpose, the circumferential projection that is in sectional form advantageously has an axially countersunk receiving groove in which the latching pin of the connecting element is held in the preassembly position under prestress by means of the snap-in tongue engaging behind the circumferential projection. By means of this configuration, a force has to be applied to the snap-in tongue in order to rotate the connecting element from the preassembly angular position into the insertion angular position.

In order to achieve a secure fit of the connecting element to the contour of the aperture of the first component in the preassembly position, the crossbar advantageously has at least one supporting surface, which faces away from the bearing collar, for stopping against a surface projection in sections of the aperture of the first component. In the preassembly position, the connecting element is then not only supported with the radial latching pin against the circumferential projection but at the same time is also supported via the supporting surface of the crossbar against a corresponding surface projection in sections of the aperture. By means of this repeated and also planar mounting, a secure fit of the connecting element to the first component is obtained in the preassembly position.

When, in the present context, mention is always made of at least two components that can be connected to each other by means of the connecting element, this does not in any way rule out the connection of three or more parts in the manner described. For example, an inside door lining, a door module with functional elements, such as a window opener or the like, and an inside door panel can be connected to one another in the manner described.

Further features, aims and advantages of the invention are revealed from the description below of an embodiment of the invention, which does not serve as a limiting example and makes reference to the attached drawings. In this case, identical components basically have the same reference numbers and some of them are not explained more than once.

DETAILED DESCRIPTION OF THE INVENTION

An exemplary embodiment of a connecting arrangement 10 according to the invention is illustrated with reference to FIGS. 1 to 11 described below, the connecting arrangement comprising a connecting element 12 (cf. FIGS. 1 to 3) that serves for the mechanical connection of two or more components, of which, however, only a first component 14, which has an aperture 15 (cf. FIGS. 4 and 5) for receiving the connecting element 12, is illustrated for the sake of giving a better overview. The first component 14 can be fixed to a second and, if appropriate, third component (not illustrated) in a manner flush with the surface thereof by means of the lockable connecting element 12.

Figure 1:
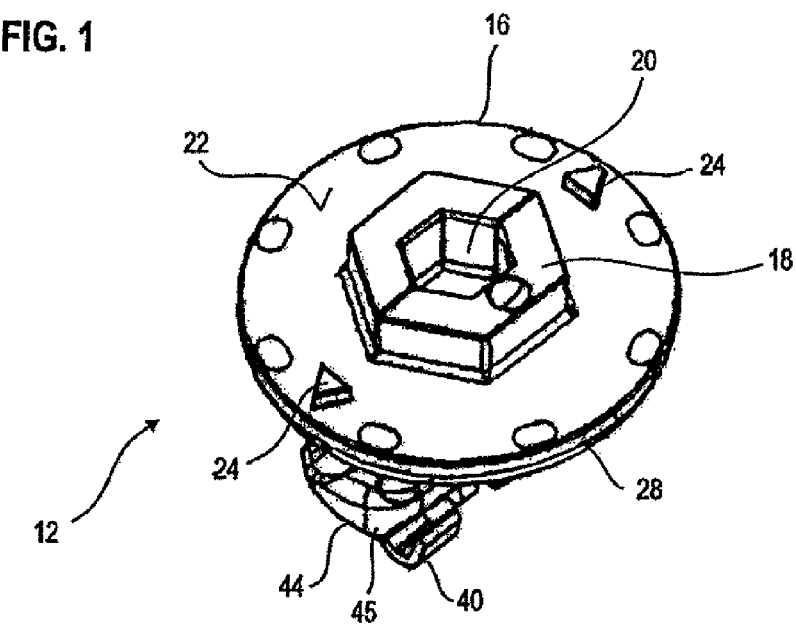
FIG. 1: An illustration of a connecting element of a connecting arrangement.
Figure 2:
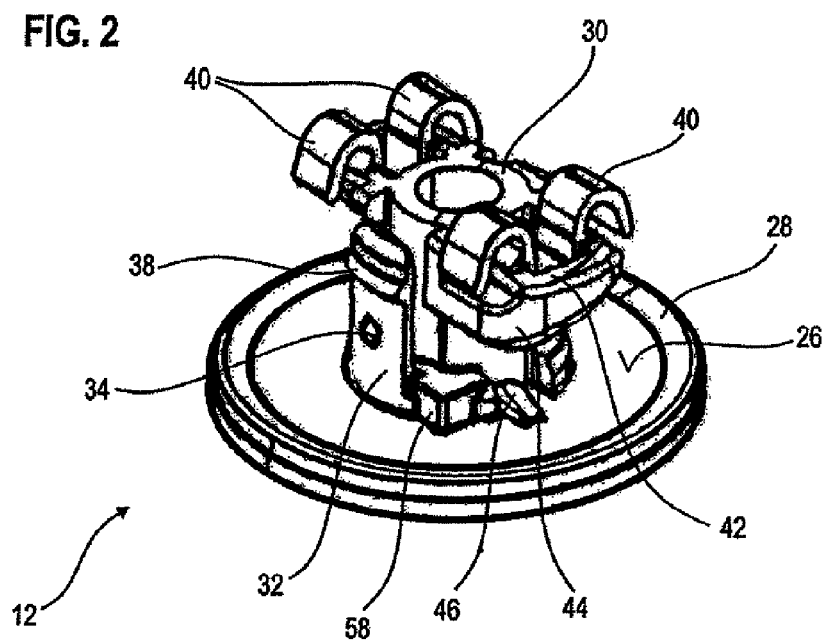
FIG. 2: A further view of the connecting element according to FIG. 1.
Figure 3:
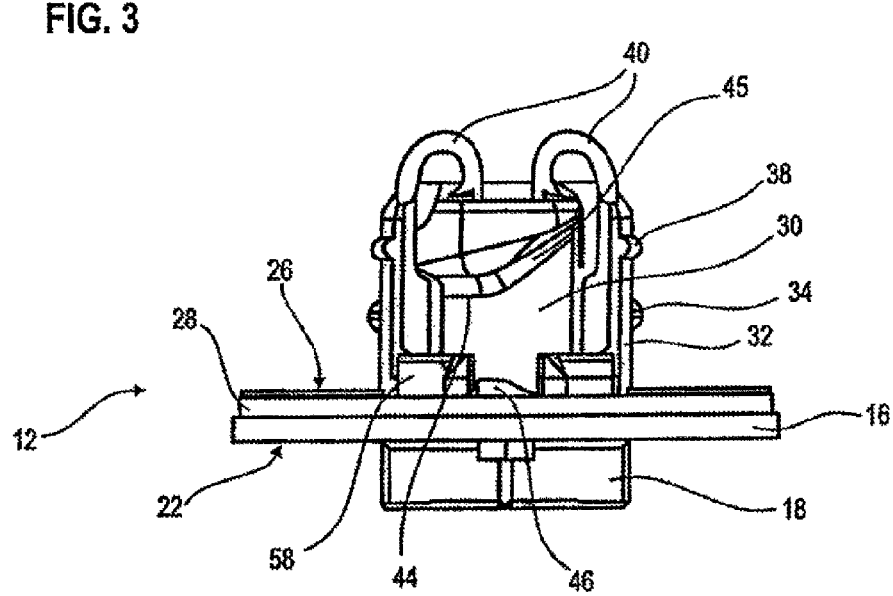
FIG. 3: A third view of the connecting element according to FIG. 1.
Figure 4:
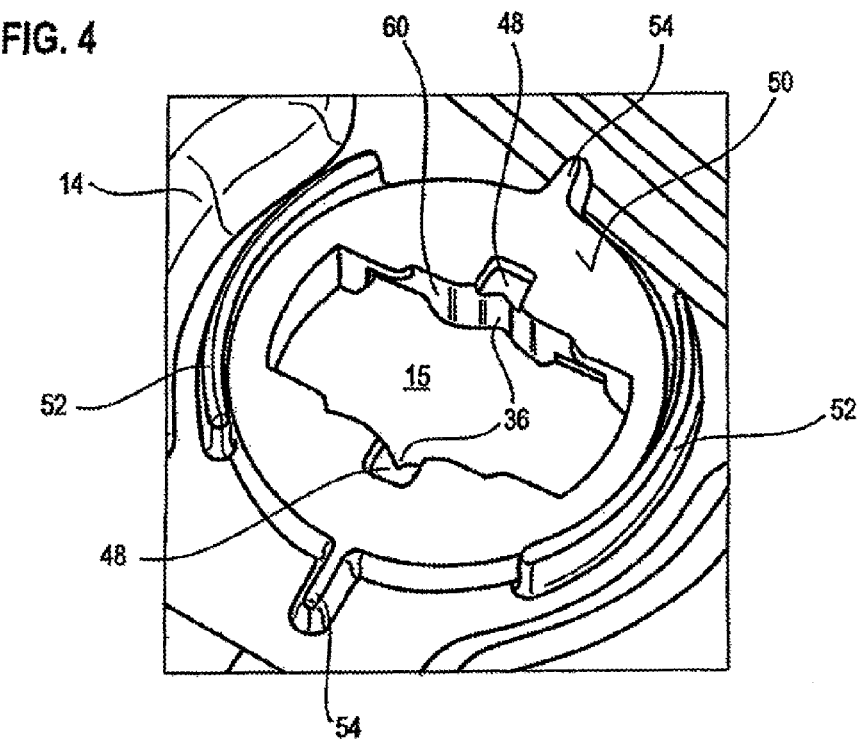
FIG. 4: An illustration of an aperture for receiving the connecting element.
Figure 5:
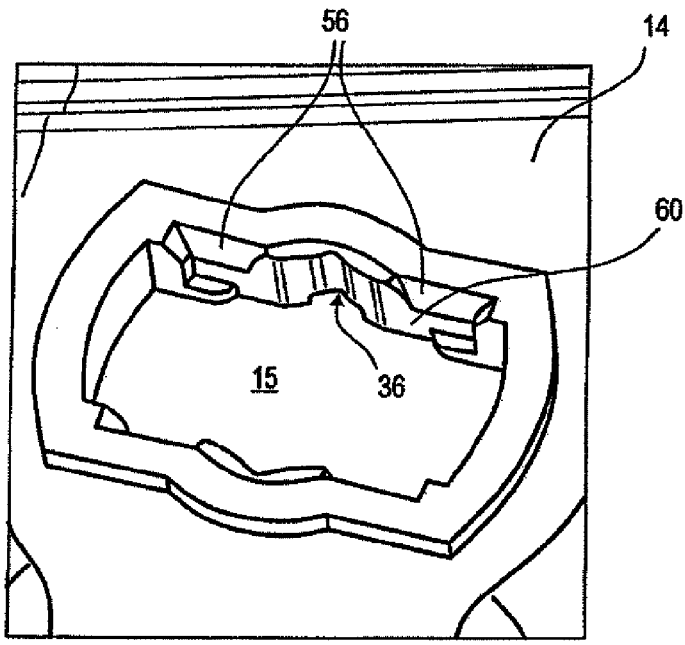
FIG. 5: A further view of the aperture according to FIG. 4.

The connecting element 12 has essentially three functional sections which are explained with reference to FIGS. 1 to 3. A first functional section is formed by a bearing collar 16 that is designed as a round bearing disk and on the outer side of which a hexagon head 18 for the fitting of a tool is arranged. An additional hexagonal socket 20 is arranged in the raised hexagon head 18 such that the locking of the connecting element (cf. FIGS. 10 and 11) can optionally take place with a ring or fork spanner or with a hexagonal spanner. Two marking arrows 24 are arranged on the front side 22 of the bearing collar 16, which side is visible from the outside, the marking arrows, in conjunction with corresponding markings on the outer side of the component, into which the connecting element 12 is inserted, indicating the unlocked and the locked state of the connecting arrangement 10. On the rear side 26 of the bearing collar 16, a sealing ring 28 which forms the supporting edge of the bearing collar 16 can optionally be provided.

On the rear side 26 of the bearing collar 16, the connecting element 12 continues in a shaft section 30 which forms a second functional section. To the side of the shaft section 30 latching tongues 32 can be seen, the latching tongue protruding perpendicularly out of the rear side 26 of the bearing collar 16 in the vicinity of the shaft section 30 and, in interaction with the correspondingly contoured aperture 15, being able to ensure latching of the connecting element 12 in a preassembly position in which it is not yet fully inserted into the aperture 15. To ensure a correct and centered guidance of the connecting element 12 in the correspondingly shaped aperture 15, the two latching tongues 32, which are arranged symmetrically, each have small guide lugs 34 on their outer sides, the guide lugs engaging in corresponding guide grooves 36 and being able to ensure that the connecting element 12 is centered there in the aperture. Furthermore, the latching tongues 32 are each provided with latching projections 38 on the outer surfaces of their free ends, the latching projections protruding slightly over the outer contour of the aperture 15 in the relaxed state of the two latching tongues 32 such that, when the connecting element 12 is inserted into the aperture 15, the latching tongues 32 are slightly compressed in the direction of the shaft section 30 until the latching projections 38 have passed the inner edge of the aperture 15 and spring back again into their relaxed original position.

Figure 6:
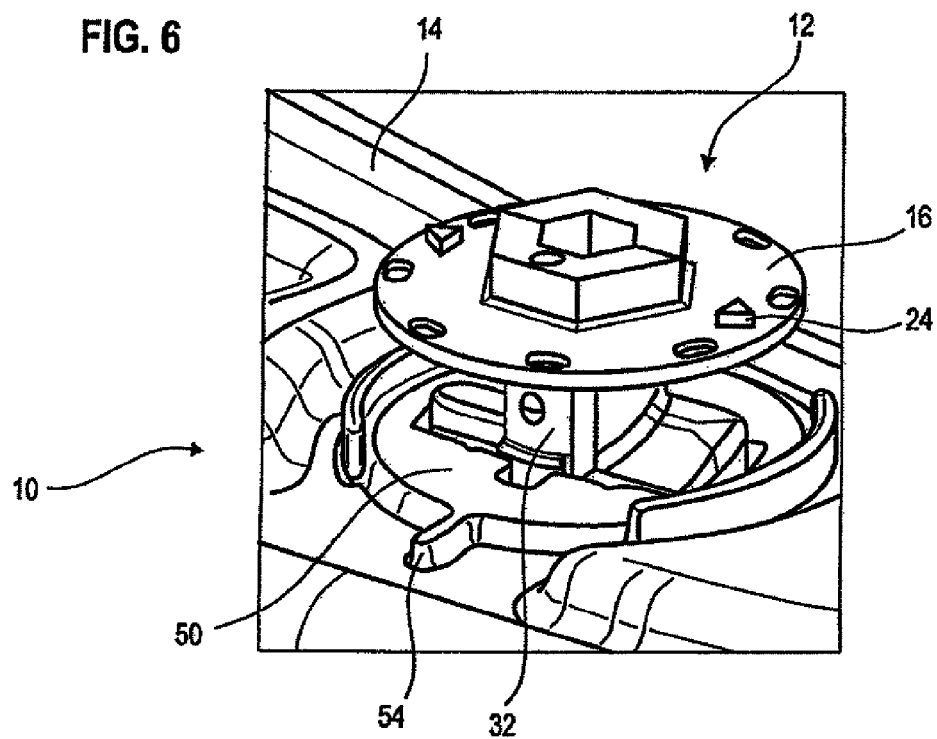
FIG. 6: An illustration of the connecting element that is inserted into the aperture in a preassembly position.
Figure 7:
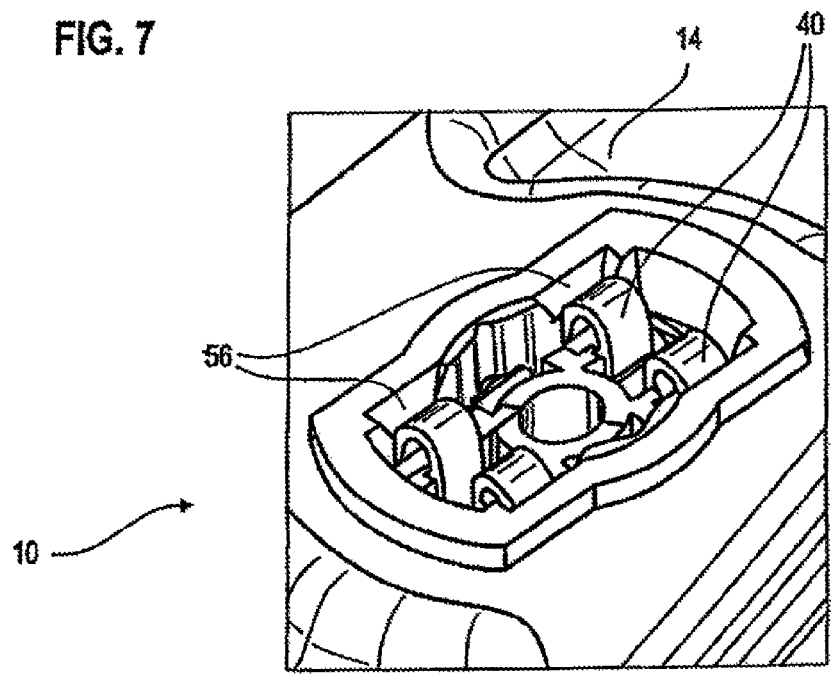
FIG. 7: A further view of the connecting element in the preassembly position.
Figure 8:
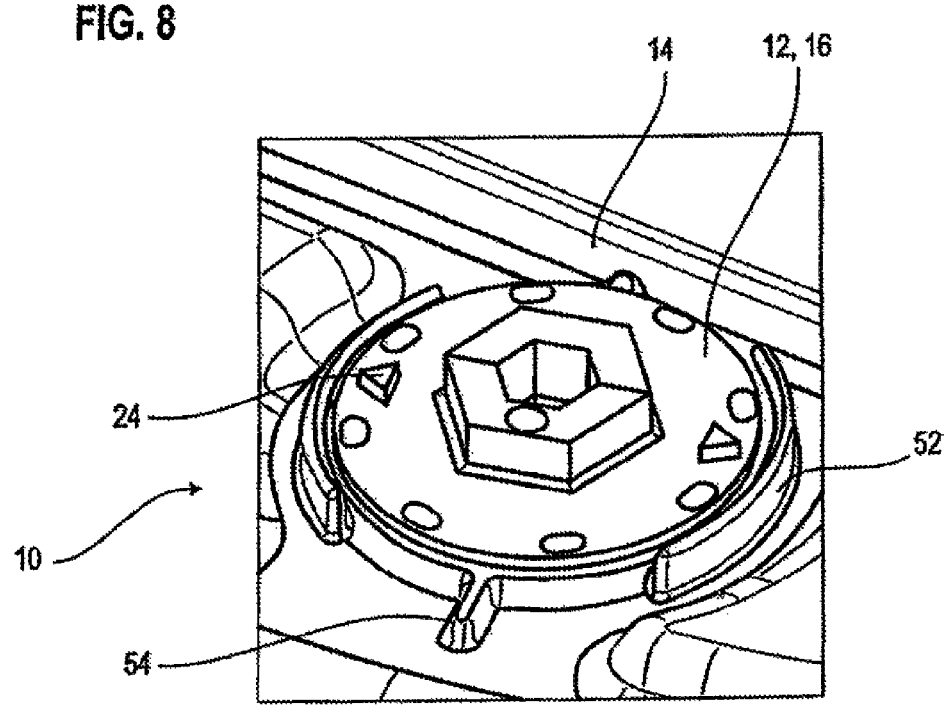
FIG. 8: An illustration of the locking element that is inserted into the aperture in a final assembly position but is not yet locked.

However, this is only the case when the connecting element 12 is to be fully inserted. The preassembly state according to FIG. 6 and FIG. 7 is characterized in that the latching projections 38 each bear against the edge of the opening of the aperture 15 and in that the latching tongue 32 are not yet compressed. In order to insert the connecting element 12 into the component 14 and to bring it into the preassembly state, it is brought, albeit with the aid of the snap-in tongues 40 described below, into a locked state that is characterized in that the connecting element 12 no longer drops out of the aperture 15 of the component 14, but forms a resistance to further insertion.

The snap-in tongues 40 are arranged on the rear side of a third functional section of the connecting element 12, the functional section being formed by a crossbar 42 that is arranged on the shaft section 30. The crossbar 42 serves to lock the connecting element 12 by means of rotation through an angle of approximately 90° by the components that are to be connected to one another being engaged behind. In order to produce a prestressing force at the same time as the parts are locked, the crossbar 42 is provided with two bearing flanks 44 that are arranged opposite each other and the wedge-shaped inlet flanks 45 of which slide, during rotation of the connecting element 12 into the locked final assembly position, on corresponding supporting surfaces of the second or third component (not illustrated) to be connected to the first component 14 and, as the angle of rotation increases, clamp the parts more strongly together.

Finally, two symmetrically arranged latching wedges 46 are provided at the foot of the shaft section 30, in a manner protruding into the rear side 26 of the bearing collar 16, the latching wedges, in interaction with correspondingly shaped latching grooves 48 in the guide surface 50 of the component 14 for the bearing collar 16, ensuring an additional slight latching of the connecting element 12 in the locked final position. Owing to the fact that, when the final position is reached, the prestressing force applied by the bearing flanks 44 is slightly reduced by the latching wedges 46 sliding into the corresponding latching grooves 48, a latching is provided. In order to rotate the connecting element 12 back, a correspondingly higher opening force has to be applied.

The lateral guidance of the bearing collar 16 in the fully inserted state of the connecting element 12 is assisted on the first component 14 by means of bearing webs 52 that laterally bound the guide surface 50. The bearing webs 52 here form parts of an annular enclosure. Furthermore, two marking lugs 54 can be seen, the marking lugs identifying the locked state when the marking arrows 24 are rotated in a manner such that they are aligned with the lugs 54 (cf. FIG. 10).

The connecting element 12 can only be pushed in a single angular position into the aperture 15 of the component 14. In this case, the crossbar 42 passes through the elongate aperture opening that resembles the contour of a rectangle. FIG. 6 illustrates the insertion of the connecting element 12 until the latching projections 38 of the latching tongues 32 rest on the edge of the aperture 15 (cf. FIG. 6). The connecting element 12 is now pushed a short distance further, with the four snap-in tongues 40 being slightly compressed (cf. FIG. 7) until they finally snap into the corresponding steps 56 on the opposite longitudinal sides of the aperture 15 and, in the process, are relaxed. The connecting element 12 is now located in the preassembly position, in which it is not yet rotated, but is already secured against dropping out and is slightly latched and in which the component 14 can easily be brought to its desired installation site and positioned there without there being the risk of the connecting element 12 dropping out and becoming lost. The preassembly position is therefore also suitable for transporting the components 14 from the supplier to the final assembly site. In particular, the connecting element 12 is aligned in this position with the rear side of the first component 14 such that the first component 14 with the connecting elements 12 arranged therein can easily be introduced even into narrow installation spaces. The inserted connecting elements 12 do not obstruct a movement of the first component 14 in relation to the further component to be connected to it.

Figure 9:
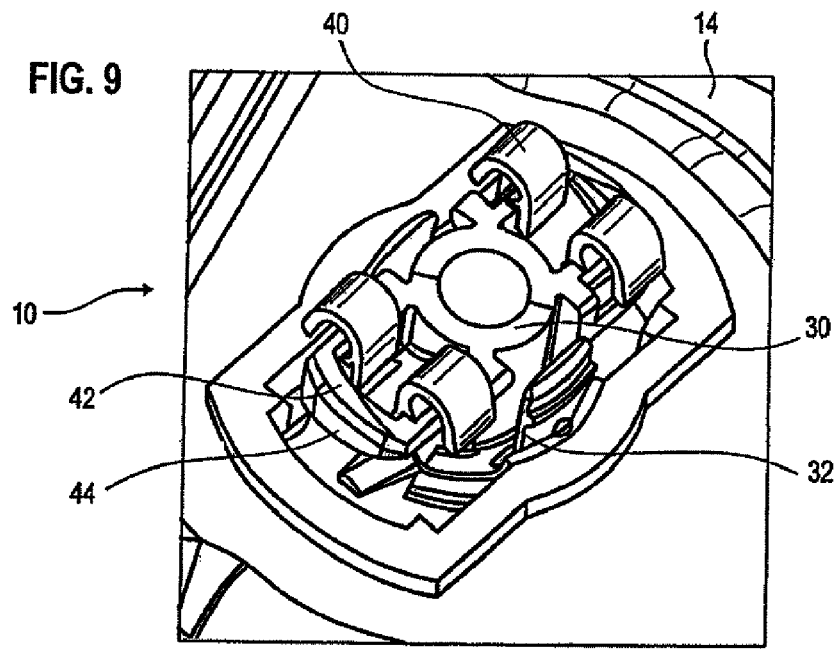
FIG. 9: A further view of the connecting element that is in the final assembly position but is not yet locked.

FIG. 9 shows an installed state in which the connecting element 12 is already pushed onto its axial stop such that the bearing collar 16 rests on the guide surface 50. The crossbar 42 is pushed here through a second and/or third component (not illustrated) that have openings that are largely aligned with the aperture 15 of the first component 14. However, various functional surfaces and edges can be omitted, for example the steps 50 or the guide grooves 36, since the elements are merely required for fixing the connecting element 12 in the first component 14 in its preassembly position. The alignment of the two components to be connected is made easier in this position, since the aperture of the further component can easily be found by the connecting element 14 protruding on the rear side of the first component 14.

Figure 10:
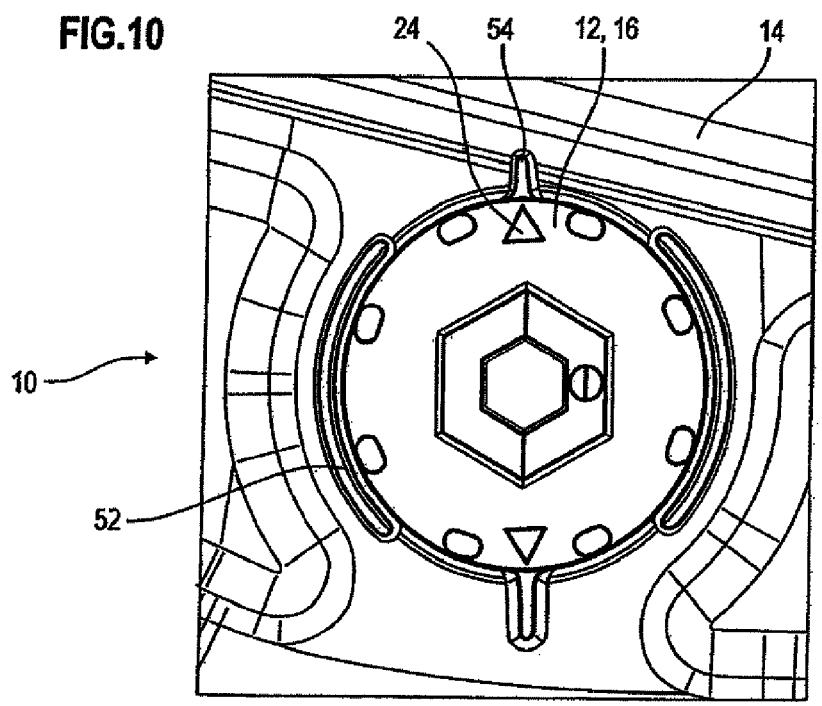
FIG. 10: An illustration of the connecting element that is in the final assembly position and is locked.
Figure 11:
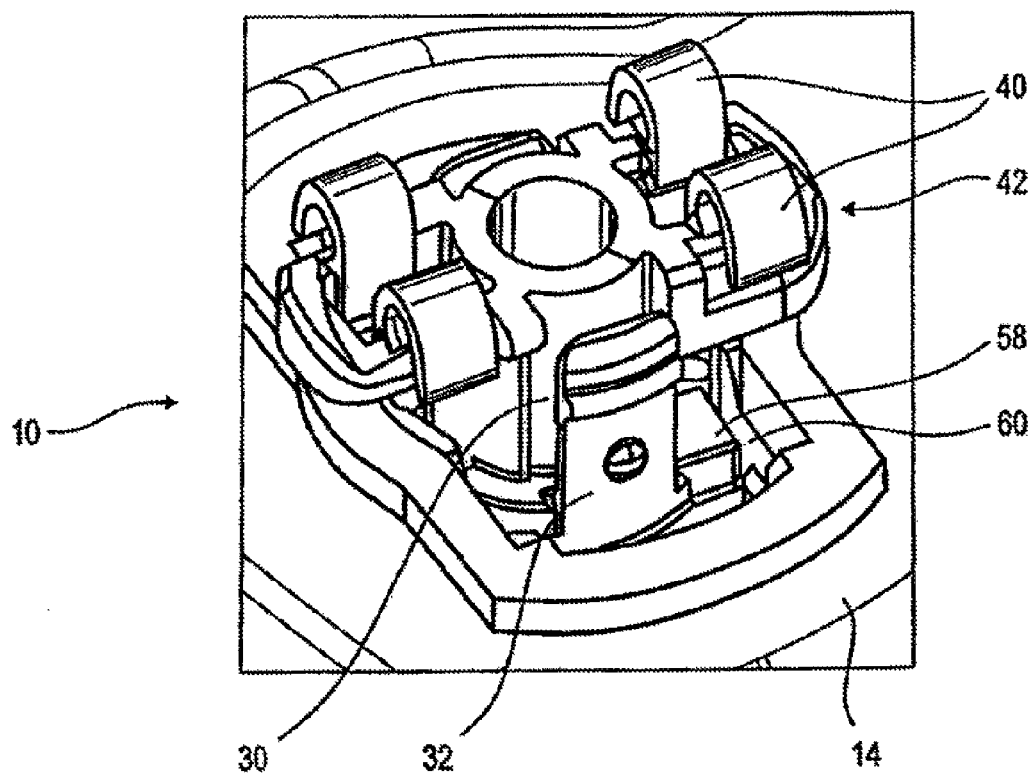
FIG. 11: A further view of the connecting element that is in the final assembly position and is locked.

After the components are attached to one another and the connecting element 12 is rotated through approximately 90° into its final assembly position corresponding to FIG. 10 and FIG. 11, the marking arrows 24 are aligned with the marking lugs 54 (FIG. 10), and the crossbar 42 with the bearing flanks 44 is located transversely with respect to the direction of longitudinal extent of the aperture 15 such that the bearing flanks 44 are clamped (cf. FIG. 11) against the corresponding bearing surfaces of the further component (not illustrated). At the same time, the clamping via the seal 28 ensures a high quality of seal between a wet space and a dry space.

In order to prevent over-rotation of the connecting element 12 beyond the maximum angle of rotation of 90° and in order to ensure a mechanical stop, additional stop steps 58 are provided next to the latching wedges 46 on the base of the shaft section 30 (cf. FIGS. 2 and 3), the bearing of which stop steps against a mating surface 60 can be seen in the rotated final assembly position according to FIG. 11. This mating surface 60 is also indicated particularly clearly in FIG. 5. A further mating surface 60 for the other stop step 58 is located diagonally opposite the mating surface 60 denoted in FIG. 5.

Figure 12:
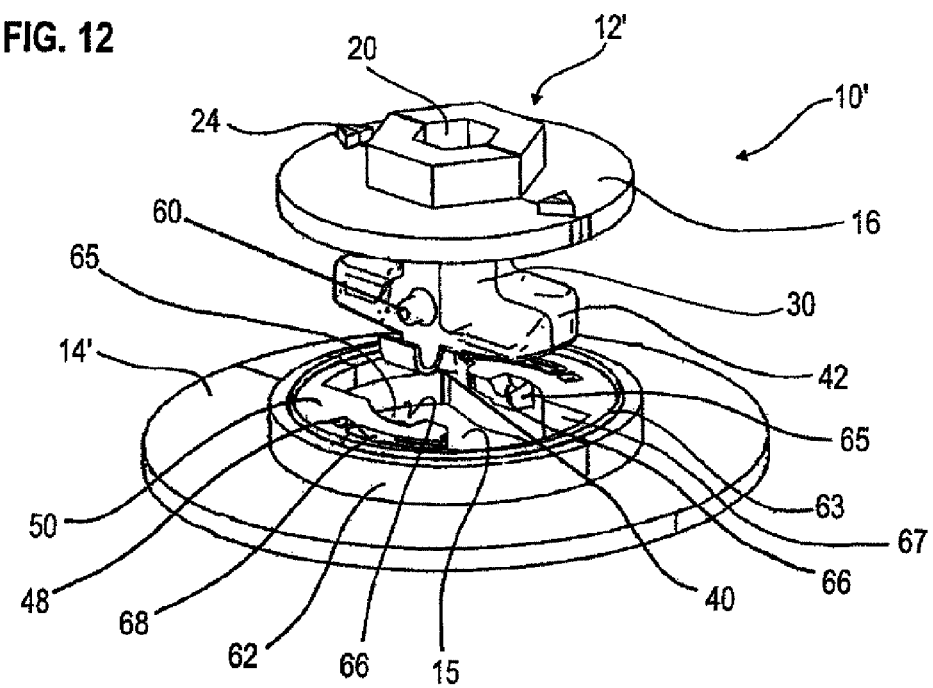
FIG. 12: An illustration of a further connecting arrangement, with the connecting element being in a preassembly angular position.

FIG. 12 illustrates a further connecting arrangement 10' that differs from the connecting arrangement 10 according to the preceding FIGS. 1 to 11 in the configuration of the contour of the aperture 15 on the first component 14' and in the functional elements corresponding thereto on the crossbar 42 and on the shaft section 30 of the connecting element 12'. In particular, the further connecting arrangement 10' is configured in such a manner that, in the preassembly position of the connecting element 12', no further pressing of the connecting element 12' through the aperture 15 in the axial direction is possible. For this purpose, an additional rotation of the connecting element 12' has to take place first. The operation of the further connecting arrangement 10' shown is now explained in detail.

In FIG. 12, the connecting element 12' is in a preassembly angular position, which corresponds to the preassembly position, in relation to the first component 14'. It can be seen that, in the angular position illustrated, the crossbar 42 can be partially introduced into the contour of the aperture 15.

Two snap-in tongues 40, of which only one can be seen in the view shown, are arranged opposite each other at the end of the shaft section 30. In this case, the snap-in tongues 40 are upwardly curved at their end toward the bearing collar 16, i.e. corresponding to FIG. 12. Two latching pins 60 protruding radially from the shaft are fitted opposite each other on the shaft section 30, in each case at a distance in the axial direction from the snap-in tongues 40. Again, only one of the latching pins 60 can be seen in the illustration shown.

Like the connecting element 12, the connecting element 12' shown in FIG. 12 also has a hexagonal socket 20 on the upper side of the bearing collar 16 and two marking arrows 24 for checking the alignment.

An encircling web 62 on which a continuous pinch seal 63 is fitted is located on the first component 14'. In a final assembly position of the connecting element 12', the pinch seal 63 serves to securely seal off a wet side from a dry side. In addition, the pinch seal 63 brings about an elastic prestress such that, in the final assembly position, a secure fit of the connecting element 12' is ensured irrespective of any mechanical tolerances.

In the interior of the encircling web 62, the aperture 15 is located in an outer guide surface 50 that partially surrounds it. The guide surface 50 here serves to support the bearing collar 16 of the connecting element 12'. A circumferential projection 65 that has an axially countersunk receiving groove 66 is furthermore arranged in sections of the contour of the aperture 15. The aperture 15 is overall configured point-symmetrically with respect to the central axis such that a further circumferential projection 65 with a corresponding receiving groove 66 is located on that side of the contour of the aperture 15 that faces the viewer but is not visible.

It can be seen that, upon further axial guidance of the connecting element 12', which is already in the preassembly angular position, the latching pins 60 each come to a stop against the respective circumferential projection 65. The latching pins 60 are each located here in the axially recessed receiving grooves 66. The latching tongues 40 are configured and dimensioned in such a manner that they engage behind the corresponding circumferential projection 65, when the latching pins 60 come to a stop in the respective recessed receiving groove 66, as a result of which the connecting element 12' is latched in relation to the first component 14' in the preassembly position.

It can furthermore be seen that, upon a rotation of the connecting element 12' in the clockwise direction from the preassembly angular position shown, with the latching pins 60 each lying in the receiving groove 66, a force has to be applied in relation to the snap-in tongues 40 which each engage behind the correspondingly circumferential projection 65.

Furthermore, further rotation is only possible in the clockwise direction when the connecting element 12' is partially introduced into the aperture 15 until the latching pins 60 come to a stop on the respective receiving groove 66. Then, upon a rotation anticlockwise, the crossbar 42 comes to a stop against a corresponding stop surface 67 on the contour of the aperture 15.

Furthermore, guide grooves 68 are again provided in the guide surface 50 in a point-symmetrical manner with respect to the central axis and a respective latching groove 48 is provided at the end of the guide grooves. The two guide grooves 68 and the two latching grooves 48 serve here to reliably rotate the connecting element 12' from its preassembly position into the final assembly position. For this purpose, two corresponding latching wedges 46 (see FIG. 13) are each embedded on the lower side of the bearing collar 16 and are guided along the guide grooves 68 until they finally latch in the latching grooves 48 at the end. This configuration also ensures that an over-rotation of the connecting element 12' is made more difficult and/or the final assembly position is reliably indicated to the fitter by this means. In addition, a rotation back of the connecting element 12' out of the final assembly position, in which the latching wedges are each latched in the latching grooves 48, is possible only with a certain noticeable counterforce.

Figure 13:
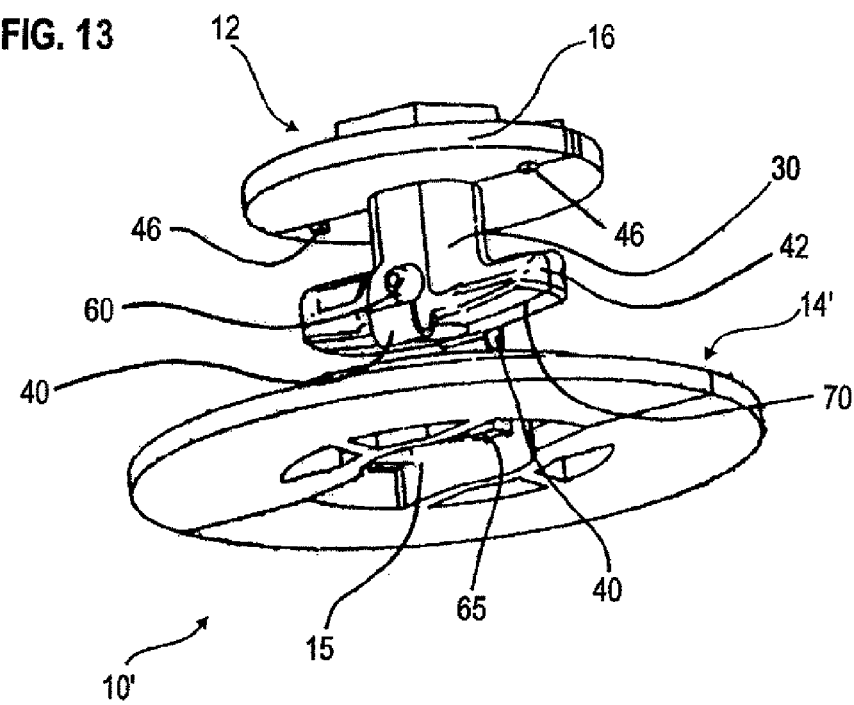
FIG. 13: A further connecting arrangement according to FIG. 12 from a different perspective.

FIG. 13 illustrates the further connecting arrangement 10' according to FIG. 12 from a different perspective. The two latching wedges 46 on the lower side of the bearing collar 16 can now be clearly seen. It is also apparent that two snap-in tongues 40 which lie opposite each other with respect to the central axis are arranged at the end of the shaft section 30.

The circumferential projection 65, against which a snap-in tongue 40 is latched in a preassembly position of the connecting element 12', can be seen from below through the aperture 15.

Figure 14:
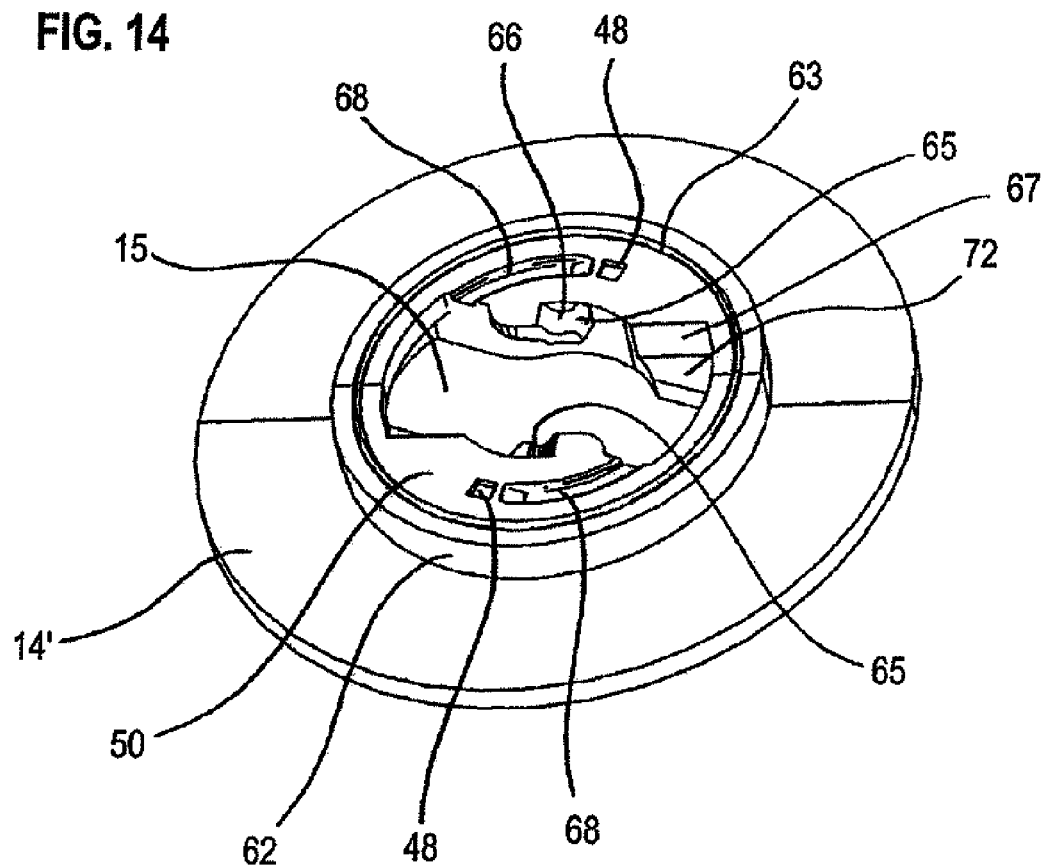
FIG. 14: A top view of the contour of the passage of the further connecting arrangement.

FIG. 14 shows in detail the contour of the aperture 15 of the first component 14', into which the connecting element 12' according to FIGS. 12 and 13 can be introduced.

The encircling web 62 and the guide surface 50 arranged in the interior of the web 62 can be seen. The two opposite guide grooves 68, at the respective end of which a latching groove 48 for receiving the latching wedges 46 apparent in FIG. 13 is provided, can each be seen in the guide surface.

The sectional circumferential projections 65 with the respective axially countersunk receiving grooves 66 can be seen on the contour of the aperture 15. The latching pins 60 of the connecting element 12' strike against the circumferential projections 65 when introduced in the preassembly angular position. At the same time, the snap-in tongues 40 each engage behind the circumferential projections 65.

Furthermore, it can now be seen clearly that the connecting element 12' in the preassembly position cannot be moved anticlockwise. This is because the crossbar 42, which is partially introduced into the aperture 15, would run here against the stop surface 67.

In order to obtain a secure fit of the connecting element 12' in the preassembly position in the aperture 15 of the first component 14', two surface projections 72 that lie opposite each other with respect to the central axis are furthermore provided on the contour of the aperture 15, and the crossbar 42 with its correspondingly configured supporting surfaces 70 (see FIG. 13) is supported against them in the preassembly position.

It can once again be seen clearly in FIG. 14 that, when the connecting element 12' is introduced axially in a preassembly angular position, it is first of all supported in a latched manner on the contour of the aperture 15. From this position, further linear guidance of the connecting element 12' through the aperture 15 is not possible. Only upon a rotation in the clockwise direction from the preassembly angular position into an insertion angular position is the crossbar 42 brought from the latched position into a position into which it can be passed through the aperture 15.

What is claimed is:

1. A connecting element for the mechanical connection of two components of a motor vehicle door, the connecting element comprising
    a bearing collar for bearing against a first component,
    a crossbar that has bearing flanks for bearing against a second component and for clamping the second component against the first component in a rotated final assembly position, and
    a shaft section that bears the crossbar, the shaft section configured for rotatably passing through corresponding apertures in the first and second components,
    wherein a mechanism for fastening to the first component in a defined preassembly position is configured such that, when in the preassembly position, the crossbar is located in the aperture and does not protrude beyond a rear side of the first component, said rear side of the first component facing said second component.

2. The connecting element according to claim 1, wherein the fastening mechanism is formed as a latching device.

3. The connecting element according to claim 2, wherein the latching device is configured to fasten to the contour of the associated aperture of the first component.

4. The connecting element according to claim 2, wherein the latching device is formed by at least one latching tongue that is arranged in the region of the shaft section and that is configured to engage a corresponding receptacle in the region of the aperture of the first component in the preassembly position.

5. The connecting element according to claim 2, wherein the latching device comprises a locking device that secures against dropping out and against rotation, when said locking device interacts with an offset in the region of the aperture of the first component.

6. The connecting element according to claim 5, wherein the locking device is formed by at least one snap-in tongue that is arranged in the region of the shaft section and/or in the region of the crossbar.

7. The connecting element according to claim 6, wherein the snap-in tongue is directed with its free end in the direction of the bearing collar and can be supported on the contour of the aperture of the first component.

8. The connecting element according to claim 6, wherein the latching device is formed by the at least one snap-in tongue and by at least one radial latching pin, wherein the at least one radial latching pin is arranged on the shaft section, offset axially with respect to the at least one snap-in tongue, and is configured to stop against a circumferential projection in sections of the contour of the aperture of the first component.

9. The connecting element according to claim 8, wherein the at least one snap-in tongue is configured to engage behind the circumferential projection in sections of the contour of the aperture of the first component.

10. The connecting element according to claim 1, wherein the crossbar has at least one supporting surface that faces away from the bearing collar, for stopping against a surface projection in sections of the aperture of the first component.

11. The connecting element according to claim 1, further comprising a latching wedge on the rear side of the bearing collar for latching in a latching groove of the first component in the final installation position.

12. The connecting element according to claim 1, further comprising a marking arrow for indicating the final assembly position on the front side of the bearing collar.

13. The connecting element according to claim 1, further comprising a stop arranged on the bearing collar to limit rotation in relation to the first component.

14. The connecting element according to claim 1, further comprising a seal for sealing and for forming an elastic prestress in relation to the first component in the region of the bearing collar.

15. A connecting arrangement comprising
the connecting element of claim 1, wherein
the connecting arrangement is adapted such that the connecting element reaches through the axially aligned apertures of the first component and of the second component in a final assembly position, and is rotated in relation to an insertion angular position into a final angular position in order to produce the connection.

16. The connecting arrangement according to claim 4, wherein the connecting element is latched to the first component in the preassembly position.

17. The connecting arrangement according to claim 16, wherein, in the preassembly position, the connecting element at least partially reaches through the aperture of the first component in the insertion angular position and is latched in the aperture of the first component.

18. The connecting arrangement according to claim 14, wherein, in the preassembly position, the connecting element at least partially penetrates the aperture of the first component, and, in a preassembly angular position rotated towards the insertion angular position, is supported in a manner such that it is latched against a contour of the aperture of the first component.

19. The connecting arrangement according to claim 18, wherein the contour of the aperture on the first component is configured such that the connecting element is moved out of the supported, latched position during rotation from the preassembly angular position into the insertion angular position, and the crossbar is adapted to be guided axially through the aperture.

20. The connecting arrangement according to claim 19, wherein the contour of the aperture of the first component has in sections a circumferential projection and a surface projection on which the connecting element is supported by at least one radial latching pin or by a supporting surface of the crossbar in the preassembly position, with the snap-in tongue engaging behind the circumferential projection, and in that the circumferential projection and the surface projection are spaced apart and dimensioned in such a manner that only in the insertion angular position is a passage opening formed in the aperture of the first component for the crossbar.

21. The connecting arrangement according to claim 20, wherein the circumferential projection comprises an axially countersunk receiving groove in which the latching pin of the connecting element is received in the preassembly position under prestressing by the snap-in tongue engaging behind the circumferential projection.

22. The connecting arrangement according to claim 15, wherein the connecting element is latched in the aperture of the second component in the final assembly position.

23. The connecting arrangement according to claim 15, wherein the connecting element bears with its bearing collar against an axial stop of the first component in the final assembly position.

24. The connecting arrangement according to claim 15, wherein the connecting element clamps the first component and the second component against each other with a defined prestressing force in the final assembly position.

25. The connecting arrangement according to claim 15, wherein the connecting element is supported elastically in relation to the first component via the seal in the final assembly position.

26. The connecting arrangement according to claim 15, wherein the connecting element engages behind the second component by means of bearing flanks in the final assembly position.

27. The connecting arrangement according to claim 26, wherein the bearing flanks each comprise a wedge-shaped inlet flank mounted upstream.

28. The connecting arrangement according to claim 15, wherein the first component has a centering device for axially and radially securing the connecting element and/or for visually displaying the insertion angular position of the final angular position.

29. The connecting arrangement according to claim 28, wherein the centering device is formed by the aperture that corresponds with the crossbar in the preassembly position.

30. The connecting arrangement according to claim 28, wherein the centering device is formed by an annular enclosure of the bearing collar.

* * * * *

UNITED STATES PATENT AND TRADEMARK OFFICE
CERTIFICATE OF CORRECTION

PATENT NO. : 8,262,333 B2
APPLICATION NO. : 12/097207
DATED : September 11, 2012
INVENTOR(S) : Rolf Bücker et al.

It is certified that error appears in the above-identified patent and that said Letters Patent is hereby corrected as shown below:

Title page, Item (73) Assignee: The Assignee "Brose Fahrzeugteile Gmbh & Co." should read -- Brose Fahrzeugteile Gmbh & Co. Kommanditgesellschaft, Hallstadt, Germany --.

Title page, please insert the foreign priority section as follows: -- Item (30) Foreign Application Priority Data, February 21, 2007, DE 20 2007 002 704.4. --.

Signed and Sealed this
Twenty-seventh Day of November, 2012

David J. Kappos
*Director of the United States Patent and Trademark Office*